Dec. 2, 1947.    G. M. WALTON ET AL    2,431,782
LIQUID FILTER VALVE STRUCTURE
Filed Feb. 7, 1945    2 Sheets-Sheet 2
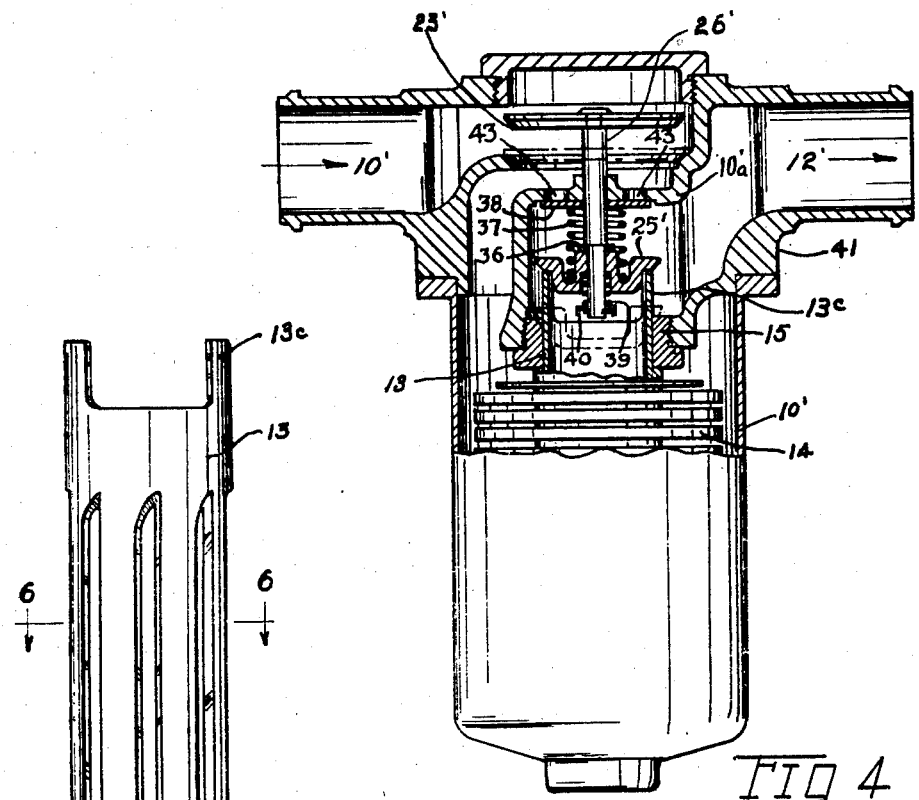
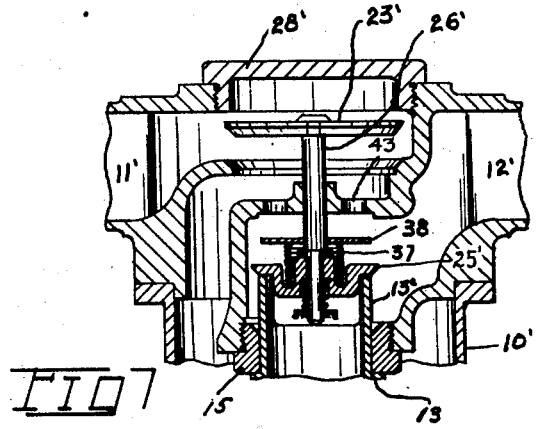
INVENTOR.
GEORGE M. WALTON
BY HENRY W. MATLOCK
Hyde and Meyer Patented Dec. 2, 1947

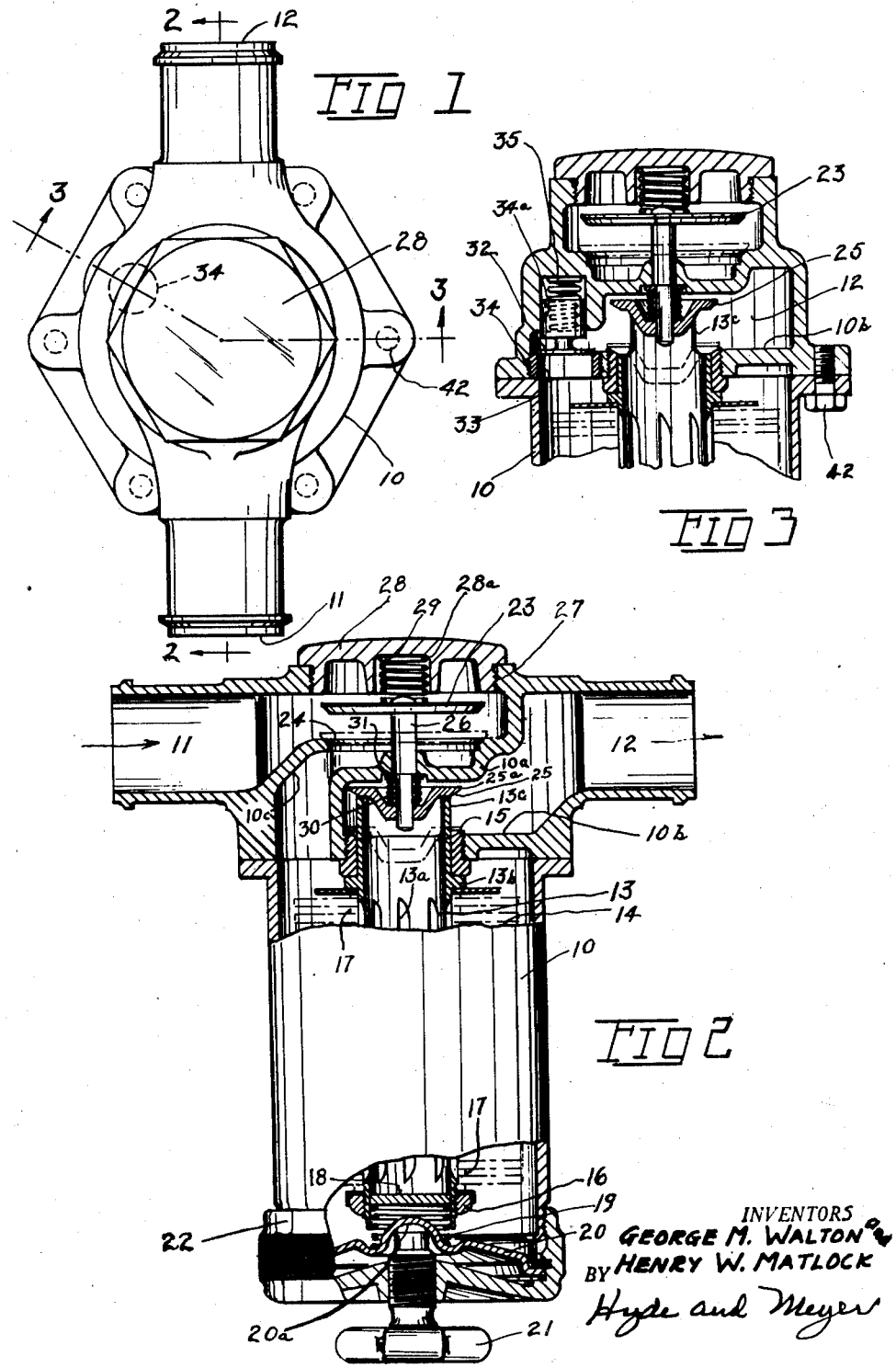

2,431,782

UNITED STATES PATENT OFFICE 2,431,782

LIQUID FILTER VALVE STRUCTURE

George M. Walton, Shaker Heights, and Henry W. Matlock, Garfield Heights, Ohio, assignors to Air-Maze Corporation, Cleveland, Ohio, a corporation of Delaware Application February 7, 1945, Serial No. 576,672

8 Claims. (Cl. 210—183)

This invention relates to improvements in a valve structure for liquid filters and more particularly to an improvement in valve structure for preventing loss of liquid through the inlet and outlet passageways of the filter housing when the filter is disassembled for cleaning.

An object of the present invention is to provide liquid filter means in a housing connected in a filtering line where the dirty liquid enters through one passageway and the clean liquid is discharged through another passageway. The present invention provides novel valve means which is adapted to close both the inlet and outlet passageways automatically upon removal of the filter means for cleaning so that no liquid is lost through the housing during a filter-cleansing operation.

Another object of the present invention is to provide valve structure as defined in the preceding paragraph which is normally held in open position by the mere act of inserting the filter means in proper position in the filter housing.

Another object of the present invention is to provide novel means for by-passing the filter means in case the latter becomes plugged or for any reasons builds up an excessive pressure whereby the flow of liquid to the downstream side of the filter means is always assured. The invention also comprises the novel combination of a by-pass valve for relieving pressure with other valves adapted to prevent loss of liquid through the inlet and discharge lines when the filter is removed from the housing for cleaning.

Other objects and advantages of our invention will be apparent from the accompanying drawings and description, and the essential features thereof will be summarized in the appended claims.

In the drawings,

Fig. 1 is a top plan view of a device embodying our invention;

Fig. 2 is a view of the same partly in elevation and partly in central section taken along the lines 2—2 of Fig. 1;

Fig. 3 is a fragmental sectional view of the upper portion of the device of Figs. 1 and 2 taken along the line 3—3 of Fig. 1;

Fig. 4 shows a modification involving a by-pass relief valve, this view being partly in elevation and partly in central section similar to Fig. 2 of the first form;

Fig. 5 is an enlarged elevational view of the central tube of the device of Fig. 2 and also the device of Fig. 4;

Fig. 6 is a transverse sectional view of the same taken along the line 6—6 of Fig. 5; while Fig. 7 is a fragmental sectional view of the upper portion of Fig. 4 showing the valves in a different position.

In the form of our device shown in Figs. 1 to 3, a housing 10 generally cylindrical in form is provided at its upper end with an inlet passageway 11 and an outlet passageway 12. Positioned centrally of the housing 10 is a hollow tube 13 having slots 13a extending through the walls thereof. Assembled on the tube is a series of annular shaped filter packs 14 of hollow-leaf form. These packs may be of any suitable character suitable forms of which are shown in the copending application of George M. Walton, Serial Number 483,911, filed April 21, 1943, or in the copending application of Robert A. Behlen, Serial Number 516,616, filed January 1, 1944. Suffice it to say here that the upper and lower faces of each of the packs 14 is of filtering material through which the liquid travels to the hollow interior of the pack 14 and thence radially inwardly passing through the openings 13a of tube 13, then upwardly through the hollow of the tube, discharging out the upper end and through the passageway 12. The partition walls 10a and 10b completely separate passageways 11 and 12. The tube 13 is mounted in the partition walls 10a and 10b by means of the bushing 15 which is threaded in those walls and has a smooth inner cylindrical surface which fits tightly around the smooth outer cylindrical surface of the upper end of tube 13. The shoulder 13b on the tube limits the upward movement thereof when the tube is secured by means presently to be described. A series of the packs 14 is assembled on the tube 13 being held tightly between the shoulder 13b at the upper end of the tube and a nut 16 which is threaded upon the lower end of the tube. Between adjacent packs 14 are spacer rings 17. The lower end of tube 13 is permanently closed by a partition wall 18 secured therein by soldering or welding. A helical spring 19 fits within the lower end of tube 13 and receives a central projection 20a of a securing disk 20 which is held in position by means of the hand wheel 21 which has a threaded connection with the cap 22 which in turn is threaded on the lower end of the housing 10. It results from this construction that the parts 13, 14, and 19 are readily assembled in the housing 10 and secured by screwing on the cap 22 and then turning down on the hand wheel 21. In like manner, the parts are readily disassembled when necessary to clean the filter.

Obviously when the cap 22 is removed for cleaning the filter, liquid will escape from the housing 10, and this cannot be avoided. Unless some means were provided, additional liquid would flow from the passageways 11 and 12 resulting in a great loss of liquid and creating a messy condition beneath the filter. To prevent this, a valve 23 is provided seating against the opening 24 in partition wall 10c of the housing to prevent the leakage of fluid from passageway 11 into the housing 10 when the filter is removed for cleaning. The valve 25 is provided and seats in the bushing 15 to prevent leakage from the passageway 12 when the tube 13 and packs 14 are removed.

Specifically valves 23 and 25 are here shown as assembled on a common valve stem 26. For assembly and disassembly purposes, threaded opening 27 is provided in the top of housing 10, and this is normally closed by a cap 28. Held in a central cup-shaped opening 28a of this cap is a helical spring 29 which normally urges valve 23 toward its seat. Valve 25 has a hollow upper surface in which is housed a helical spring 30, the upper end of which rests against disk 31 which in turn is held by a shoulder on the valve stem 26. It will be noted that this valve stem is reciprocably mounted in the partition wall 10a.

The valve 25 has a flange 25a extending radially outwardly. When the parts are in the assembled position shown in Fig. 2, the upper end of tube 13 is provided with spaced members 13C which engage beneath the flange 25a and hold the valve 25 open. The upper end of tube 13 is more clearly shown in Fig. 5.

It should now be apparent that when tube 13 carrying its assembled packs 14 is inserted upwardly through the bushing 15 and held in place by the cap 22 and the hand wheel 21, the upwardly extending end portions 13c of the tube 13 raise the valve 25 from its seat, compress the spring 30 which in turn pushes against the disk 31 and the shoulder of valve stem 26 so as to raise valve 23 from its seat also. Thus the mere act of properly positioning and securing the filter assembly in place within the housing 10 automatically opens the valves 23 and 25 and holds them open. Conversely the mere act of removing the cap 22 and removing the tube 13 downwardly out of the housing 10 permits the spring 30 to close the valve 25 and permits the spring 29 to close the valve 23. The spring 29 is somewhat stronger than the spring 30 because the spring 29 drives the two valves and the stem 26 downwardly while the spring 30 merely takes up the slack between the disk 31 and the valve 25. The closed positions of valves 23 and 25 are indicated in dot-dash lines in Figs. 2 and 3.

The device thus far described is complete in itself and is satisfactory in those cases where a stoppage of liquid flow in the discharge passageway 12 would not be a disadvantage. In some cases, however, as in an engine lubricating system, a supply of liquid on the downstream side of the filter at all times is imperative. To take care of this situation, we have shown how a by-pass valve may be incorporated in our device as indicated in Figs. 1 and 3. In a portion of the housing, to one side of the valves 23 and 25, an opening 32 is provided communicating through the partition 10c and providing means for liquid flow from passageway 11 to passageway 12 without going through the filtering means. Into the opening 32 is threaded a bushing 33 providing a valve seat. A by-pass valve 34 is provided to normally close the opening 32. This by-pass valve has an upper guiding stem 34a into the hollow upper end of which enters a helical spring 35 which urges the valve 34 toward its seat. It should be obvious that upon the build-up of a heavy pressure within the housing 10, the liquid under pressure will raise the valve 34 from the position shown in Fig. 3 permitting the escape of liquid directly to the outlet passageway 12, thus by-passing the filter.

In Figs. 4 and 7, we have shown a modified form of our device wherein the function of the by-pass valve is performed by a valve structure incorporated in the same general arrangement which includes the valves 23' and 25' whose functions are exactly like the functions of valves 23 and 25 described in connection with the first form of our device. Here parts having the same function as the parts described in connection with Figs. 1 to 3 have been given the same reference characters with a prime suffix. Therefore, it will be necessary only to describe the new parts in connection with this modification.

As described in connection with the first form of our device, a plurality of filter leaves 14 are assembled on the tube 13 with spacers between the leaves. The valves 23' and 25' are mounted on the common stem 26' and are held open between upwardly extending ends 13c of tube 13 as indicated in full lines in Figs. 4 and 7. It should be obvious from these views that the mere act of inserting the filter means including the tube 13 into the housing 10' directly lifts the valve 25' from its seat against the bushing 15. The central hub of the valve 25' bears against a ring 36 which in turn presses upwardly on a shoulder of valve stem 26' and thus serves to lift the valve 23' from its seat. The closed positions of these two valves are indicated in dot-dash lines in Fig. 4. When the filtering means is disassembled from the housing 10', a helical spring 37 surrounding stem 26' bears against the valve 38 in the position shown in Fig. 4 and acts downwardly on valve 25' to urge this valve toward its seat on bushing 15 as the tube 13 moves downwardly. Thus the valve 25' will prevent flow of liquid from discharge passageway 12' into the housing 10'. A helical spring 39 surrounds the lower end of stem 26' and is held between a disk 40 in fixed position on the stem and between the lower face of valve 25'. This gives a yielding mounting of the valve 25' on the stem 26'. Thus as valve 25' moves downwardly, it compresses spring 39 and carries valve stem 26' downwardly so that the valve 23' moves to the dot-dash position of Fig. 4 into engagement with its coacting seat. Thus these parts function similar to valves 23 and 25 previously described.

It should be understood that the housing 10' is secured to the upper housing portion 41 by means of cap screws like that shown at 42 in Fig. 3. Therefore, the filter means 13, 14 may be assembled and disassembled by manipulation of the cap screws 42. However, if desired, structure like that shown at 19, 20, 20a, 21, and 22 may be supplied at the bottom of the housing 10' exactly in the same position as they occupy at the bottom of the housing 10 as described in connection with Fig. 2. In such a structure, the filter means 13, 14 might be removed vertically downwardly out of the housing 10' by removing the cap 22 without disturbing any of the other parts if desired.

The novel by-pass structure shown in Figs. 4 and 7 comprises the valve 38 previously mentioned which normally serves to close openings 43 through the partition wall 10a'. The spring 37 in the position of Fig. 4 normally urges valve 38 upwardly so as to close the openings 43 against the passage of liquid.

The above is the normal position of the by-pass valve, but on the occurrence of excessive pressure either in the passageway 11 or in the housing 10' (due to plugging of the filter), the pressure liquid will cause valve 38 to move downwardly to the position shown in Fig. 7 compressing the spring 37 as shown. This permits a by-passing of liquid directly from passageway 11' to passageway 12' without going through the filter means. Upon the relief of the excessive pressure conditions, spring 37 will again cause valve 38 to close.

What we claim is:

1. In combination, a housing, liquid filter means therein, inlet and outlet conduits communicating with said housing and having valves, one for each conduit, controlling flow between the respective conduits and said housing, means urging said valves toward closed position, and operative means between said filter means and said valves for holding both of said valves open only when said filter means is in filtering position in said housing.

2. In combination, a housing, liquid filter means therein, inlet and outlet conduits communicating with said housing and having valves, one for each conduit, controlling flow between the respective conduits and said housing, said filter means including a perforated tube through which all of the liquid flows, means projecting from the end of said tube, and said valves being positioned for engagement by means of said projecting means to hold open both of said valves when said filter means is in filtering position in said housing.

3. In combination, a housing, liquid filter means therein, inlet and outlet conduits communicating with said housing and having valves, one for each conduit, controlling flow between the respective conduits and said housing, said filter means including a perforated tube through which all of the liquid flows, a valve stem axially alined with the axis of said tube, both of said valves being mounted on said stem, and means projecting from the end of said tube and adapted to open said valves when said filter means is in filtering position in said housing.

4. In combination, a housing, liquid filter means therein, inlet and outlet conduits communicating with said housing and having valves, one for each conduit, controlling flow between the respective conduits and said housing, said filter means including a perforated tube through which all of the liquid flows, a valve stem axially alined with the axis of said tube, first partition means between said housing and said outlet conduit, there being an opening through said partition means through which said tube extends, second partition means between said inlet conduit and said outlet conduit, there being an opening through said second partition means through which said valve stem extends, an outlet valve on said stem between said partitions, an inlet valve on said stem on the inlet conduit side of said second partition, valve seats for each of said valves, spring means urging said valves toward said seats, and spaced projections on the end of said tube engaging said outlet valve to hold the same open when said filter means is in filtering position in said housing, there being an operative connection between said outlet valve and said stem for moving said stem to hold said inlet valve open.

5. In liquid filter means, a housing having inlet and outlet conduits communicating therewith, a liquid filtering element in said housing adapted to filter liquid passing from said inlet conduit to said outlet conduit, valve means controlling flow between one of said conduits and said housing, an operative connection between said filter element and said valve means for holding the latter open when said filter means is in filtering position in said housing, and a by-pass valve providing direct communication between said inlet and outlet conduits independent of said filtering element.

6. The combination of claim 3, wherein by-pass valve means is carried by said stem and provides direct communication between said inlet and outlet conduits independent of said filter means.

7. The combination of claim 4, wherein there is provided a by-pass opening through said second partition means, a by-pass valve on the outlet conduit side of said second partition means and carried by said stem, and means urging said by-pass valve in a direction to close said by-pass opening.

8. The combination of claim 4, wherein there is provided a by-pass opening through said second partition means and adjacent said stem, an annular by-pass valve slidably mounted on said stem on the outlet conduit side of said second partition means, and a helical spring embracing said stem and engaging between said outlet valve and said by-pass valve to urge both said valves toward their seats.

GEORGE M. WALTON.
HENRY W. MATLOCK.

REFERENCES CITED

The following references are of record in the file of this patent:

UNITED STATES PATENTS

| Number | Name | Date |
| --- | --- | --- |
| 1,407,763 | Langston | Feb. 28, 1922 |
| 1,220,231 | Jack | Mar. 27, 1917 |
| 1,746,274 | Otis, Jr. | Feb. 11, 1930 |
| 1,507,806 | Zeller | Sept. 9, 1924 |
| 2,331,119 | Gouldbourn et al. | Oct. 5, 1943 |
| 1,058,737 | Elliott | Apr. 15, 1913 |
| 1,720,380 | Schulze | July 9, 1929 |
| 1,295,006 | Corey | Feb. 18, 1919 |
| 922,657 | Worsey | May 25, 1909 |
| 2,344,486 | Arvins et al. | Mar. 21, 1944 |

FOREIGN PATENTS

| Number | Country | Date |
| --- | --- | --- |
| 541,588 | Great Britain | Nov. 28, 1941 |
| 736,742 | France | Nov. 28, 1932 |